(12) United States Patent
Mooney et al.

(10) Patent No.: US 8,086,287 B2
(45) Date of Patent: Dec. 27, 2011

(54) SYSTEM AND METHOD FOR SWITCHING BETWEEN AUDIO SOURCES

(75) Inventors: Philip D. Mooney, Sellersville, PA (US); Joseph M. Cannon, Harleysville, PA (US); James A. Johanson, Macungie, PA (US)

(73) Assignee: Alcatel Lucent, Paris (FR)

( * ) Notice: Subject to any disclaimer, the term of this patent is extended or adjusted under 35 U.S.C. 154(b) by 2012 days.

(21) Appl. No.: 09/767,839

(22) Filed: Jan. 24, 2001

(65) Prior Publication Data

US 2002/0098878 A1    Jul. 25, 2002

(51) Int. Cl.
*H04M 1/00* (2006.01)
(52) U.S. Cl. .................. 455/575.2; 455/556.1
(58) Field of Classification Search .......... 455/569, 455/41, 66, 557, 575, 560, 550.1, 575.2, 455/575.6, 41.2, 517, 569.1, 568, 550, 556.1, 455/209; 379/308; 710/1; 381/381, 24
See application file for complete search history.

(56) References Cited

U.S. PATENT DOCUMENTS

| | | | | |
|---|---|---|---|---|
| 5,757,929 A * | 5/1998 | Wang et al. | ........... | 381/300 |
| 5,867,794 A * | 2/1999 | Hayes et al. | ........... | 455/557 |
| 6,091,812 A * | 7/2000 | Iglehart et al. | ........... | 379/308 |
| 6,298,218 B1 * | 10/2001 | Lowe et al. | ........... | 455/66.1 |
| 6,633,747 B1 * | 10/2003 | Reiss | ........... | 340/384.1 |
| 2002/0044661 A1 * | 4/2002 | Jakobsson et al. | ........... | 380/270 |
| 2002/0068610 A1 * | 6/2002 | Anvekar et al. | ........... | 455/560 |

* cited by examiner

*Primary Examiner* — Tu X Nguyen
(74) *Attorney, Agent, or Firm* — Capitol Patent & Trademark Law Firm, PLLC

(57) ABSTRACT

A system and method is provided for monitoring a plurality of audio sources and switching from one to another of the audio sources in accordance with a stored program. An audio output device receives a signal from each of the portable electronic devices and selectively switches the contents of its output according to at least one preprogrammed user preference. The audio output device also automatically communicates with transceiver modules connected to local information systems, for example within a vehicle, office or shopping center. Based on programs stored in a storage device connected to the headset, the local information sources may be monitored and selected to interrupt other audio sources received by the headset when desired.

21 Claims, 3 Drawing Sheets

SYSTEM AND METHOD FOR SWITCHING BETWEEN AUDIO SOURCES

BACKGROUND OF THE INVENTION

1. Field of the Invention

The present invention relates generally to communications between electronic devices, and, more particularly, to a system and method for switching the output of an audio device from one to another of a plurality of audio sources in accordance with a stored program.

2. Description of the Related Art

In recent years, public use of portable electronic devices, such as wireless communication and playback devices, i.e., cell phones, personal digital assistants (PDAs), personal computers, compact disc (CD) players, AM/FM radios and the like, have increased greatly. To enhance their mobility, such devices are designed to be light and compact. A user should be able to comfortably carry the device in a pocket, purse or briefcase. Many of these devices are typically provided with several user friendly functions, for example programmable settings for easy configuration, standardized audio outputs, clocks, calendars and the like.

Despite all of the technological advancements, such portable electronic devices are not without their shortcomings. For example, while many of the electronic devices are compatible with standard audio output (e.g., they have a headphone jack), a user may encounter difficulties in using multiple devices simultaneously or sequentially as desired. A conventional audio output device, for example a headphones set or headset, typically permits a user to monitor the audio output of only one device at a time. Thus, a user may miss an important mobile telephone call if the user is listening to the audio output of the CD player instead of the mobile telephone. For another example, a user may not be notified of an important electronic message received at a notebook computer if the user is instead listening to the audio output of an AM/FM radio.

To combat these shortcomings, one common solution is to enable a sound generator for each portable electronic device and set the output level to a high enough value so that each device is capable of interrupting any other. This solution is undesirable in many public spaces because it annoys those within audible range and generally adds to the noise pollution problem already pervasive at most public gatherings.

Another common solution is to use a personal headset and manually switch between devices as desired. In addition, several headsets may be worn by a single user simultaneously. These solutions are cumbersome and the use of multiple headsets is often considered unsightly. When multiple devices are monitored simultaneously, frequent manual switching may become a burdensome task requiring a user to devote substantial time and attention to monitoring several audio devices for the occurrence of impromptu events, i.e., listening for the ring of the mobile telephone, the beep of the pager, the e-mail alert sound of the notebook computer and/or the appointment alert of the PDA, and then manually switching to the appropriate device when an audible alert is received. For many portable electronic devices, the user must react to the alert and switch between audio sources within a short time period to receive an incoming message, for example receiving a mobile telephone call.

Therefore, there exists a need and desire for a system and method that will simplify the task of switching between multiple available audio devices in a timely fashion in response to preprogrammed events.

SUMMARY OF THE INVENTION

The present invention mitigates the problems associated with the prior art and provides a unique system and method for monitoring a plurality of audio sources and switching from one to another of the audio sources in accordance with a stored program.

In accordance with one aspect of the invention, portable electronic devices are provided with built-in transceiver modules which automatically communicate with each other and with an audio output device that also has a built-in transceiver module. The audio output device receives a signal from each of the portable electronic devices and selectively switches the contents of its output according to at least one preprogrammed user preference.

In accordance with another aspect of the invention, a personal audio output device, e.g., a headset, is provided with a built-in transceiver module which automatically communicates with transceiver modules connected to local information systems, for example within a vehicle, office or shopping center. Based on programs stored in a storage device connected to the headset, the local information sources may be monitored and selected to interrupt other audio sources received by the headset when desired.

In accordance with another aspect of the invention, switching between audio sources may be performed on the basis of the contents of the incoming message. For example, a user may program the headset to receive certain high-priority messages (e.g., a fire alarm), but bypass certain low-priority messages (e.g., advertisements) available from local information sources.

These and other advantages and features of the invention will become apparent from the following detailed description of the invention which is provided in connection with the accompanying drawings.

DETAILED DESCRIPTION

Figure 1:
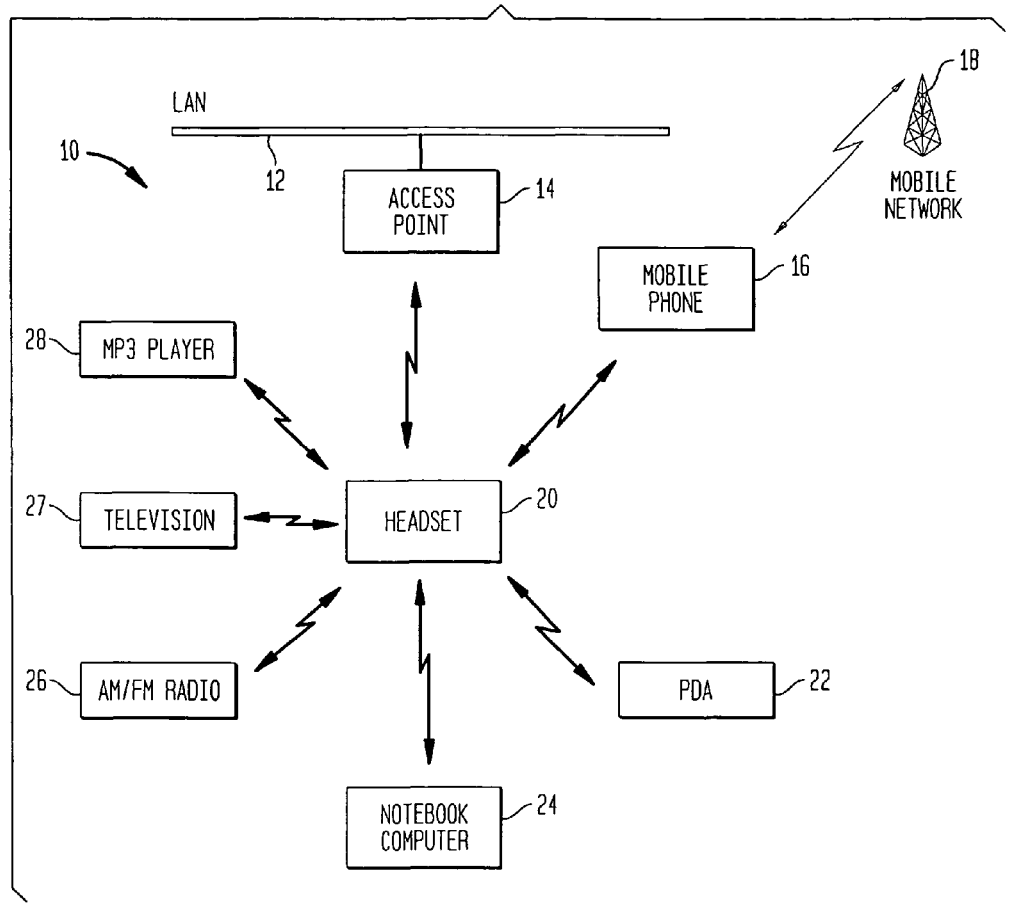
FIG. 1 illustrates a communications network including a plurality of electronic devices that may be monitored and selected for audio output in accordance with an exemplary embodiment of the invention.

The present invention will be described as set forth in the exemplary embodiments illustrated in FIGS. 1-3. Other embodiments may be utilized and structural, logical or programming changes may be made without departing from the spirit or scope of the present invention. Like items are referred to by like reference numerals throughout the description.

In accordance with the present invention, a user may program an audio output device to selectively switch between audio sources based on user preferences. FIG. 1 illustrates a communications network 10 including a plurality of electronic devices that may be monitored and selected for audio output in accordance with an embodiment of the invention. A user may employ an audio output device (e.g., a headset 20) to listen to the audio output of one or more of a plurality of electronic devices. Each electronic device may be a source of audio information (i.e., an audio source) and communicate with the headset 20. Exemplary audio sources include, for example, a notebook computer 24, an AM/FM radio 26, a personal digital assistant (PDA) 22, a television 27, a digital audio player such as a Motion Picture Experts Group (MPEG) Audio Layer 3 (MP3) player 28, a mobile telephone 16, and a local information system access point 14. The mobile telephone 16 is connected to a mobile network 18 for interactive communications as is well known in the art. The local information system access point 14 is connected to a local area network (LAN) 12 for communicating information of interest to users in a particular locality, for example within a shopping mall or amusement park. The headset 20 may be used to receive an audio signal output of each of the electronic devices 14, 16, 22, 24, 26, 27, 28, and select among the audio signal outputs according to the desires of the user of the headset 20.

Figure 3:
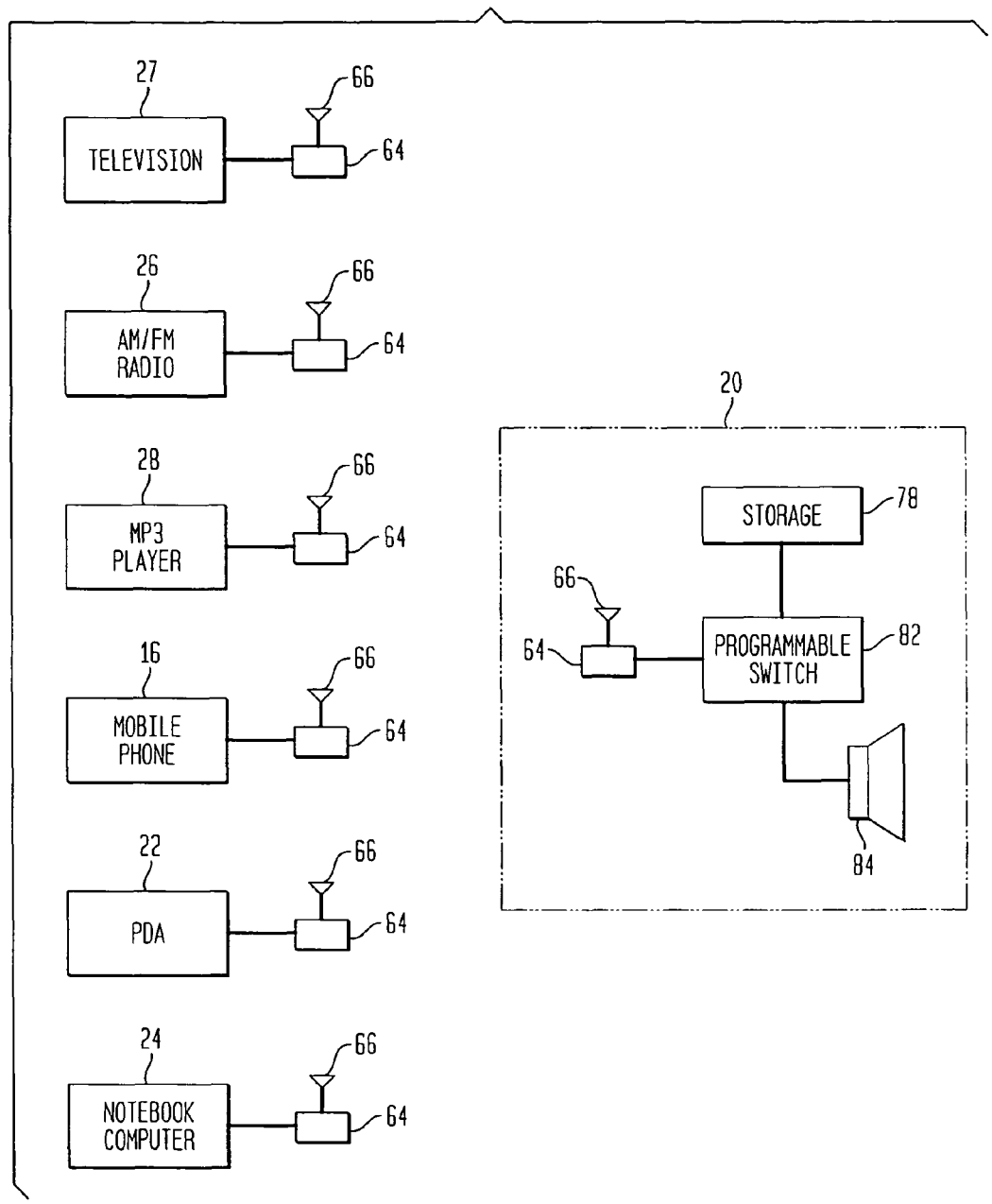
FIG. 3 illustrates a plurality of audio sources and an audio output device including a programmable switch that operates in accordance with the exemplary embodiment illustrated in FIG. 2.

The electronic devices 16, 22, 24, 26, 27, 28 in the communications network 10 communicate with the headset 20 using a transceiver 64 connected to each device 16, 22, 24, 26, 27, 28, as shown in FIG. 3. The transceiver 64 may use one of a variety of communications mediums to transmit and receive, including radio waves, infrared signals, microwave signals, ultrasonic signals, visible light signals, and other electromagnetic transmission media known in the art. Where radio waves are used, each transceiver 64 is typically connected to an antenna 66 for communicating with a transceiver 64 connected to another device 16, 20, 22, 24, 26, 27, 28. At the headset 20, the transceiver 64 is connected to a programmable switch 82. The programmable switch 82 is connected to an audio signal reproducing device 84, for example earpiece speakers in the headset 20, for reproduction of an audio signal.

The programmable switch 82 is also connected to a storage device 78 that stores one or more programs, or sets of instructions for switching the programmable switch 82 according to a user or system preference. Although the storage device 78 is shown within the headset 20, this is not required and the storage device 78 may be connected to the programmable switch via the transceiver 64 and the antenna 66, or alternatively via some other communication system, such as a radio-frequency (RF) wireless data bus.

The programmable switch 82 may be programmed according to the personal preferences of a user of the headset 20. A user interface useful for entering user preferences, e.g., a keyboard and LCD, may be included in the headset 20, although this is not preferred. Instead, configuration and entry of user preferences may be performed using another device equipped for complex user interaction, for example a notebook computer 24 or PDA 22. For example, specialized software executed on the notebook computer 24 may utilize the transceivers 64 and the antennas 66 of the notebook computer 24 and the headset 20 to communicate programming data and user preferences that are stored at the storage device 78 for later use. During operation of the headset 20, the stored programming data and user preferences may be used to selectively switch the audio output of the headset 20 between the audio signals generated by the devices 16, 22, 24, 26, 27, 28. In this way, a minimum of simple controls may be included on the headset 20, for example a volume controller and one or more controls to confirm switching (e.g., a button to answer an incoming mobile telephone call).

In order for the electronic devices 16, 20, 22, 24, 26, 27, 28 to communicate effectively, a protocol should be established that is common to all of the electronic devices. One exemplary protocol is known as Bluetooth™. Bluetooth™ is a wireless communication standard that describes how electronic devices, such as wireless telephones, PDAs, and personal computers, can easily interconnect with each other and with home and business phones and computers using a short-range wireless connection. The Bluetooth™ specification ensures that diverse devices supporting the Bluetooth™ technology can communicate with each other worldwide. The Bluetooth™ protocol allows for automatic connections to be established between the devices 16, 20, 22, 42, 26, 27, 28 without any user intervention. Thus, when Bluetooth™ equipped devices come within range of one another, such as for example when headset 20 comes in range of an access point 14, the headset 20 and access point 14 will communicate with each other via a radio frequency link to determine if they have information to share or whether one needs to control the other.

Bluetooth™ utilizes a technique called spread-spectrum frequency hopping, in which multiple pseudo-randomly chosen frequencies within a designated range are utilized, with the chosen frequency changing on a regular basis. By regularly changing the frequencies within the given range, Bluetooth™ devices are prevented from interfering with one another as it is unlikely that more than one device within range will be on the same frequency at the same time. In Bluetooth™, the transmitters change frequencies 1,600 times every second. When an initial conversation between Bluetooth™ devices has occurred, such as for example between a headset 20 and access point 14 of FIG. 1, a piconet, or small network, is created between headset 20 and access point 14. Thereafter, the headset 20, access point 14 and any other electronic devices subsequently connected to the piconet will randomly hop frequencies in unison to maintain the transfer of data.

A Bluetooth™ piconet typically includes one "master" for configuring and maintaining the piconet, and up to seven additional "slaves" that communicate with the master. In accordance with the invention, the headset 20 may be configured as a master of its own piconet that includes the devices 16, 22, 24, 26, 27, 28. Alternatively, the headset 20 may be configured as a slave in multiple separate piconets, for example each device 16, 22, 24, 26, 27, 28 could have its own piconet and the headset 20 could be a member of each device's piconet.

It will be appreciated by those skilled in the art that many different audio sources may be used with the programmable headset 20. Exemplary audio sources include an AM/FM radio, a mobile telephone, a walkie-talkie, a television, a compact disc (CD) player, a cassette tape player, a digital audio player (e.g., MP3 player), a vehicle audio system (e.g., car stereo), various kitchen and household appliances (e.g., microwave oven, toaster, stove, popcorn popper, etc.), a pager, a personal computer, a personal digital assistant (PDA), and various local and regional broadcast sources including short-range commercial radio systems (e.g., shopping center advertising).

It will also be appreciated by those skilled in the art that more than one audio channel may be included in an audio signal received from an audio source. An exemplary audio signal received from an audio source may be a monaural, stereo or multi-channel audio signal. For example, an audio source may transmit a stereo audio signal including at least two audio channels (e.g., right and left channels).

Figure 2:
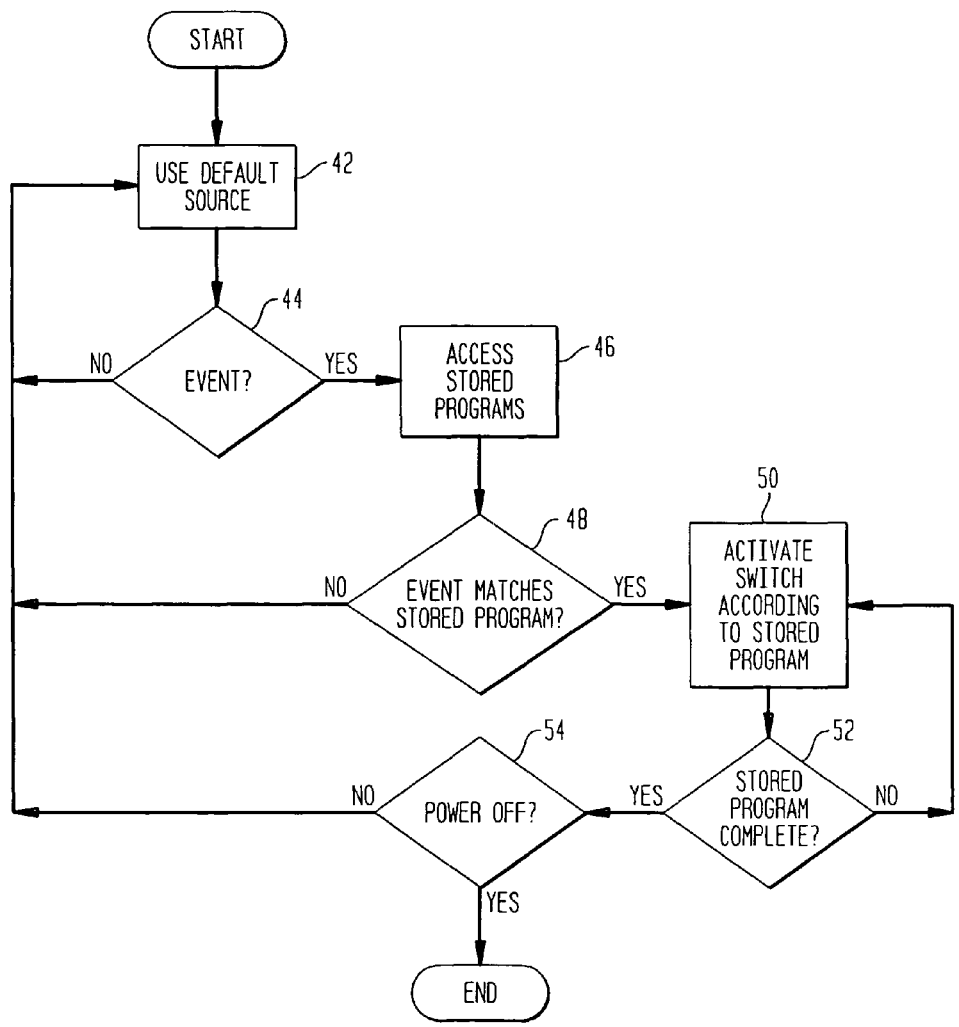
FIG. 2 illustrates in block diagram form a method for switching between audio sources in accordance with an exemplary embodiment of the invention.

An exemplary embodiment of the method of the present invention is illustrated in FIG. 2. When a user wishes to listen to a particular audio source but be available for interruptions, for example a mobile telephone message, the audio output device (e.g., a programmable headset 20) permits selection of an initial or default audio source in method segment 42. For example, a user may listen to the AM/FM radio 26 while waiting for a call on the mobile telephone 16. When an event, e.g., an incoming telephone call, occurs in method segment 44 for which the user may want to switch audio outputs, the programmable headset 20 accesses one or more stored switching programs in method segment 46. The switching programs may be stored in a storage device included in the programmable headset 20, or alternatively the programs may be stored at a remote location and accessed via a communications network, such as a Bluetooth™ piconet.

The programmable headset 20 compares an event list associated with each of the stored programs to the event that has occurred and searches for a match in method segment 48. If no match is found with an event associated with a stored program, the programmable headset continues output of the default audio source. If a match is found with a stored program, the programmable headset 20 executes the matching stored program at method segment 50. The stored program usually includes one or more instructions to switch to specific audio sources in order to receive information or a desired message. For example, when the event is an incoming mobile telephone call, the stored program may include switching the audio output of the programmable headset 20 to the mobile telephone ring tone generator for a specified period or until the user answers the telephone. Thereafter, the audio output of the programmable headset 20 may be switched to the voice output of the mobile telephone to permit the user to communicate with the incoming caller.

When the stored program has completed its instructions for switching between audio sources at method segment 52, the programmable headset 20 may return to the default audio source at method segment 42. Alternatively, the programmable headset 20 may be powered down at method segment 54 if the event occurring at method segment 44 is a power off command.

A variety of events may be sensed by the programmable headset 20 and associated with a stored program for use in switching between audio sources. Exemplary events may include an incoming telephone call, an outgoing telephone call (off-hook signal), a specified date and time, an incoming news flash (e.g., special report), an incoming advertisement from a nearby merchant, a walkie-talkie transmission, a message from an vehicle diagnostic or warning system, a message from an emergency broadcast system, depression of a doorbell, a message from a household appliance (e.g., microwave done bell), a fire alarm, activation of a baby monitor, an incoming pager message, an incoming electronic mail message, and the like.

Although the invention has been described with reference to "switching" between discrete audio sources, this is not required and one or more audio sources may be configured with specific decibel levels while combined or faded in/out as desired in accordance with the invention. For example, a user listening to a CD player may not be instantly switched between a music recording and the ring sound of the mobile telephone when an incoming call is detected, but instead the ring sound may be faded in or overlaid on top of the music recording to achieve an aural result that is pleasing to the user. The user may then switch to just the mobile telephone if the user does not want to hear the music during the call or the user may leave the music playing in the background.

Furthermore, while the invention has been described with respect to a programmable headset 20, the invention is not so limited. It will be appreciated by a person of skill in the art that many different audio output devices may be used in accordance with the invention. Exemplary audio output devices may include home audio system speakers, vehicle audio system speakers, television speakers, personal computer audio output devices, clock radio speakers, a facility public address (PA) system (e.g., an airport PA system), mobile telephone audio output, walkie-talkie audio output, and the like. Each of the aforementioned exemplary audio output devices may include or be connected to a programmable switch 82, a storage device 78 and a transceiver 64 for programmable switching between audio sources in accordance with the exemplary embodiments of the invention described with reference to FIGS. 1-3.

Reference has been made to preferred embodiments in describing the invention. However, additions, deletions, substitutions, or other modifications which would fall within the scope of the invention defined in the claims may be implemented by those skilled in the art and familiar with the disclosure of the invention without departing from the spirit or scope of the invention. Accordingly, the invention is not to be considered as limited by the foregoing description, but is only limited by the scope of the appended claims.

What is claimed as new and desired to be protected by Letters Patent of the United States is:

1. A method of switching among wireless audio sources, comprising:
   receiving a plurality of Bluetooth™ compliant transmissions at a headset, each including a respective input audio signal, from respective electronic devices; and
   selecting at least one of said received audio signals at the headset in accordance with at least one stored selection instruction overlaid on an initially selected audio signal at the headset, said selection instruction specifying a designated triggering event for triggering said selection, wherein said designated triggering event is receipt of an advertising message from a merchant.

2. A method of switching among wireless audio sources, comprising:
   receiving a plurality of Bluetooth™ compliant transmissions at a headset, each including a respective input audio signal, from respective electronic devices; and
   selecting at least one of said received audio signals at the headset in accordance with at least one stored selection instruction overlaid on an initially selected audio signal at the headset, said selection instruction specifying a designated triggering event for triggering said selection, wherein said designated triggering event is selected from the group consisting of receipt of an incoming information update and receipt of an advertising message from a merchant.

3. A method as in claim 2, wherein said group further includes receipt of a message from a wireless audio source.

4. A method as in claim 2, wherein said group further includes a particular date and time.

5. A method as in claim 2, wherein said group further includes receipt of an electronic message at a wireless audio source.

6. A method as in claim 2, wherein said group further includes a request to communicate via a mobile telephone.

7. A method as in claim 2, further comprising selecting at least another of said received audio signals after said triggering event has concluded.

8. A method as in claim 2, wherein said selecting is performed according to a plurality of selection instructions.

9. A method as in claim 8, wherein each of said selection instructions is associated with a respective electronic device so that selection of a particular electronic device occurs in response to a triggering event included in the associated selection instruction.

10. A method as in claim 2, wherein said group further includes a chronological event.

11. A method as in claim 2, wherein said group further includes a mobile telephone transmission.

12. A method as in claim 2, wherein at least one of said electronic devices is a mobile telephone.

13. A method as in claim 2, wherein at least one of said electronic devices is an AM/FM radio.

14. A method as in claim 2, wherein at least one of said electronic devices is a compact disc (CD) player.

15. A method as in claim 2, wherein at least one of said electronic devices is a walkie-talkie radio.

16. A method as in claim 2, wherein at least one of said electronic devices is a personal computer.

17. A method as in claim 2, wherein at least one of said electronic devices is a television.

18. A method as in claim 2, wherein at least one of said electronic devices is an access point.

19. A method as in claim 2, wherein at least one of said electronic devices is an MPEG compatible device.

20. A method as in claim 2, wherein at least one of said electronic devices is a PDA.

21. A method as in claim 2, wherein at least one of said electronic devices is a notebook computer.

\* \* \* \* \*